(12) United States Patent  
Uchiyama et al.

(10) Patent No.: US 9,122,273 B2  
(45) Date of Patent: Sep. 1, 2015

(54) FAILURE CAUSE DIAGNOSIS SYSTEM AND METHOD

(75) Inventors: Hiroki Uchiyama, Kawasaki (JP); Shinya Yuda, Hitachi (JP); Hideaki Suzuki, Hitachi (JP); Kozo Nakamura, Hitachiota (JP)

(73) Assignee: HITACHI, LTD., Tokyo (JP)

( * ) Notice: Subject to any disclaimer, the term of this patent is extended or adjusted under 35 U.S.C. 154(b) by 476 days.

(21) Appl. No.: 13/578,034

(22) PCT Filed: Feb. 26, 2010

(86) PCT No.: PCT/JP2010/001303
§ 371 (c)(1),
(2), (4) Date: Aug. 9, 2012

(87) PCT Pub. No.: WO2011/104760
PCT Pub. Date: Sep. 1, 2011

(65) Prior Publication Data
US 2012/0310597 A1 Dec. 6, 2012

(51) Int. Cl.
*G06F 15/00* (2006.01)
*G05B 23/02* (2006.01)

(52) U.S. Cl.
CPC ........ *G05B 23/0221* (2013.01); *G05B 23/0278* (2013.01); *G05B 2219/24019* (2013.01); *G05B 2219/24042* (2013.01)

(58) Field of Classification Search
CPC ................. G05B 23/0278; G05B 2219/24019; G05B 23/0221; G05B 2219/24042
See application file for complete search history.

(56) References Cited

U.S. PATENT DOCUMENTS

| | | | |
|---|---|---|---|
| 2006/0184264 A1* | 8/2006 | Willis et al. | 700/108 |
| 2007/0028220 A1* | 2/2007 | Miller et al. | 717/124 |
| 2008/0015726 A1* | 1/2008 | Harvey et al. | 700/110 |
| 2010/0174444 A1* | 7/2010 | Hansson et al. | 701/33 |
| 2010/0214069 A1* | 8/2010 | Kong | 340/10.1 |
| 2010/0257410 A1* | 10/2010 | Cottrell et al. | 714/45 |

FOREIGN PATENT DOCUMENTS

| | | |
|---|---|---|
| CN | 101438249 | 5/2009 |
| JP | 2002-99319 | 4/2002 |
| JP | 2005-241089 | 9/2005 |
| JP | 2007-293489 | 11/2007 |
| JP | 2008-071270 | 3/2008 |
| JP | 2008-71270 | 3/2008 |
| JP | 2009-199289 | 9/2009 |
| JP | 2010-501091 | 1/2010 |
| WO | WO 2007/130692 A2 | 11/2007 |

OTHER PUBLICATIONS

CN Office Action for Chinese Application No. 201080063535.3, issued on Jun. 18, 2014.

* cited by examiner

*Primary Examiner* — Mohamed Charioui
*Assistant Examiner* — John Kuan
(74) *Attorney, Agent, or Firm* — Baker Botts L.L.P.

(57) ABSTRACT

The invention is related to a system and a method to determine whether a target equipment deviates from a normal state. If it is determined that the target equipment to be diagnosed deviates from the normal state, the degree of deviation of each parameter from the normal state as the reference is calculated as an abnormal contribution ratio. A failure cause is estimated from a similarity ratio between the calculated abnormal contribution ratio and the abnormal contribution ratio of each of the failure causes collected in the past and including failure phenomena and failure parts.

14 Claims, 9 Drawing Sheets

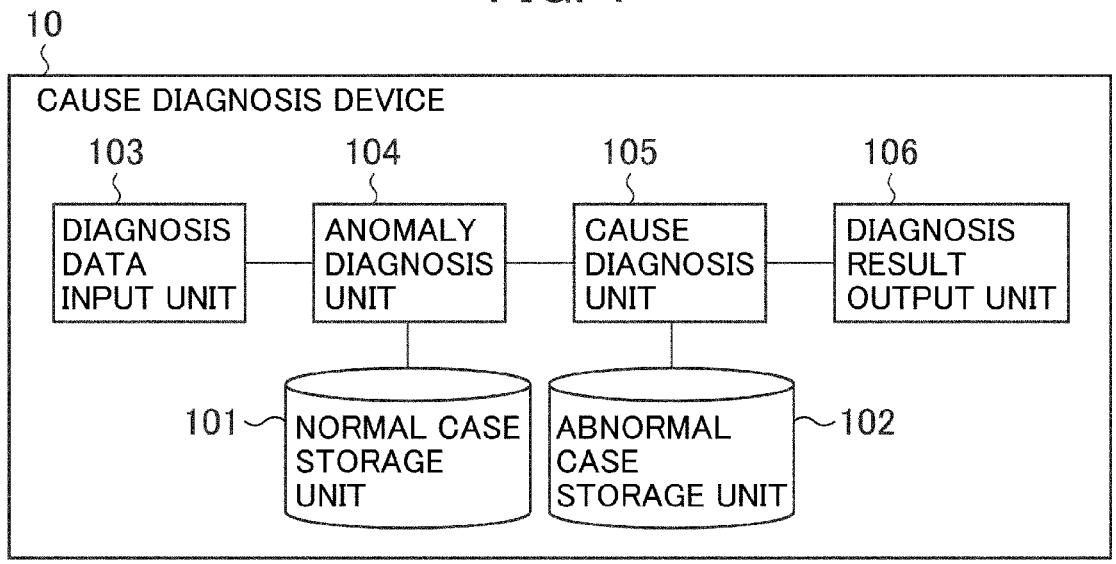
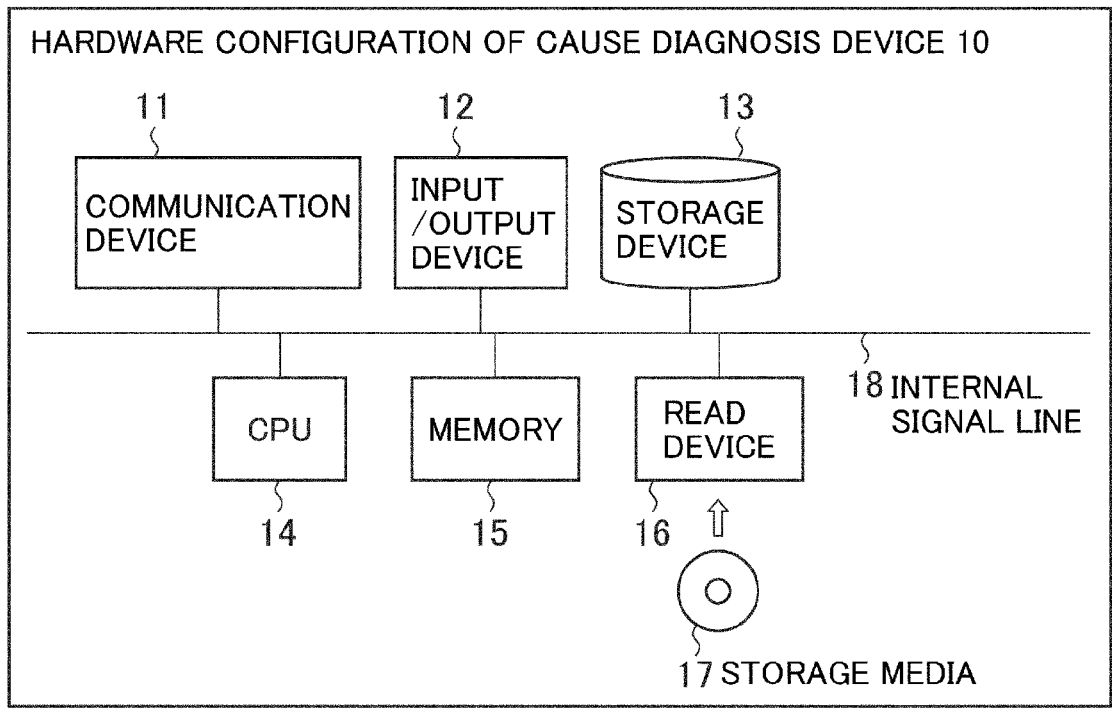

FIG. 9
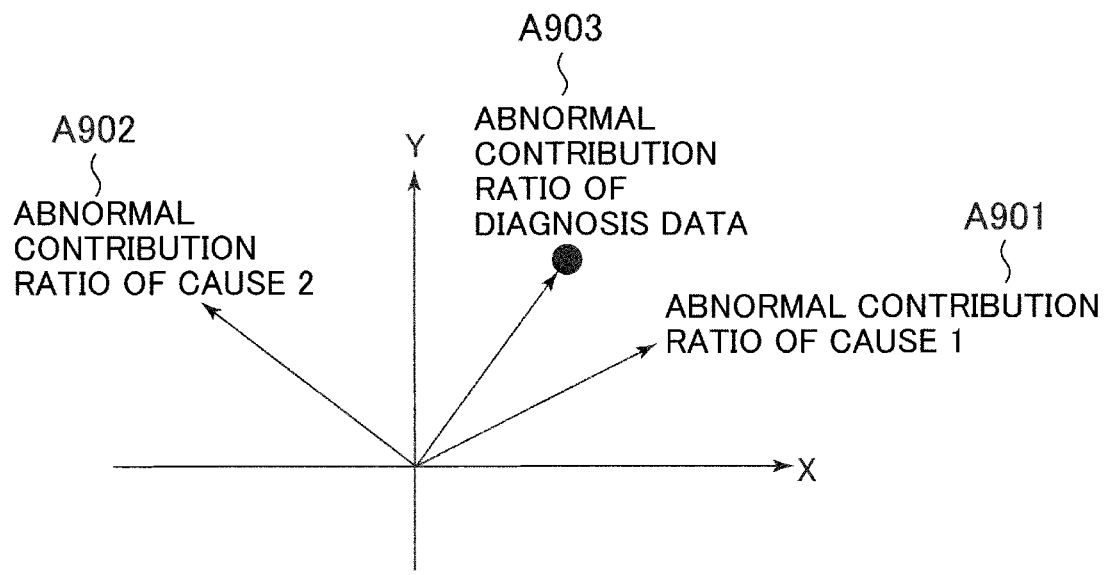
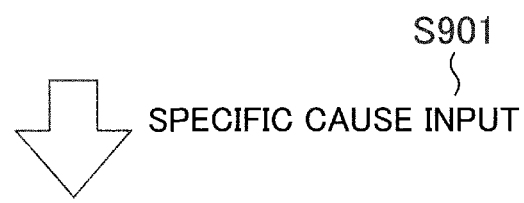
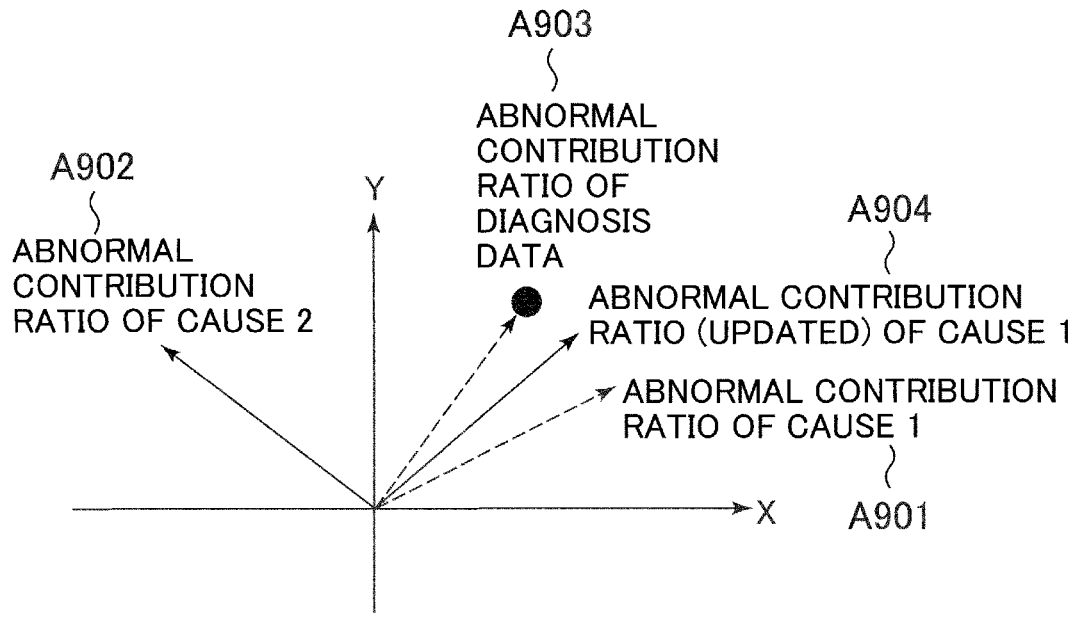

FIG. 13

DESIGN INFORMATION (A1301)

| | Anomaly Condition of Parameter 1 | Anomaly Condition of Parameter 2 | ... | Anomaly Condition of Parameter N |
|---|---|---|---|---|
| Name of Cause 1 (A1302₁) | A1303₁₁ | A1303₁₂ | ... | A1303₁N |
| Name of Cause 2 (A1302₂) | A1303₂₁ | A1303₂₂ | ... | A1303₂N |
| ⋮ | ⋮ | ⋮ | | ⋮ |
| Name of Cause N (A1302N) | A1303N1 | A1303N2 | ... | A1303NN |

US 9,122,273 B2

FAILURE CAUSE DIAGNOSIS SYSTEM AND METHOD

TECHNICAL FIELD

The present invention relates to a system for diagnosing failure causes of industrial equipment, plant and the like. More particularly, the invention relates to a system and a method for estimating failure causes including failure phenomena and failure parts by operational data about the equipment in an abnormal state.

BACKGROUND ART

Conditional base maintenance has been gaining widespread acceptance, with numerous sensors attached to equipment for constant monitoring of its operational state, the resulting sensor data being compared with those about the equipment in the normal state for a diagnosis to determine whether the equipment is currently operating normally, the result of the diagnosis being used to conduct maintenance. Conditional base maintenance can rapidly detect aging deterioration of the equipment, so that abnormal states that were not detected before in time base maintenance can now be detected. However, although conventional diagnosis technology can distinguish between the normal state and abnormal state, it has been difficult with such technology to identify causes or parts of abnormalities.

To address the above problem, there is a known technique for calculating the distance in waveform between the timeline data about the target process signal to be diagnosed and the case data stored in a case database, the distance being used to obtain the ratio of similarity therebetween to diagnose the state of the plant (see Patent Document 1).

Also, there is a known technique that presupposes the advance learning of a normal space and an abnormal space, the technique involving estimating a failure cause from the distance between the measured data to be diagnosed and the abnormal space (see Patent Document 2).

RELATED ART LITERATURE

Patent Documents

Patent Document 1: JP-2002-99319-A
Patent Document 2: JP-2005-241089-A

SUMMARY OF THE INVENTION

Problems to be Solved by the Invention

The technique for diagnosing the state of the plant based on the distance from the case data has difficulty in making accurate diagnoses because it is incapable of recognizing data characteristics that vary with individual differences of the target equipment to be diagnosed or with the environment in which the equipment is used. Also, the technique for estimating failure causes from the distance between the target data to be diagnosed and the abnormal space is incapable of estimating the correct cause unless the abnormal space has been learned precisely in advance.

The present invention has been made in view of the above circumstances and provides a system and a method for varying the data used in diagnosis depending on the individual differences of the target equipment to be diagnosed and on the environment in which the equipment is used, the system and method being further aimed at implementing a failure cause diagnosis that is applicable where the number of failure cases is limited.

Means for Solving the Problems

In achieving the foregoing object of the present invention, there is provided a failure cause diagnosis system including a cause diagnosis device for diagnosing a failure cause of equipment; wherein the cause diagnosis device includes: a normal case storage unit storing operational data in effect when equipment is the normal state or values obtained by transformation of the operational data in the normal state; an abnormal case storage unit storing operational data in effect when equipment is in an abnormal state or values obtained by transformation of the operational data in the abnormal state; a diagnosis data input unit inputting operational data about the target equipment to be diagnosed; an anomaly diagnosis unit determining whether there is an anomaly by using the diagnosis data and the normal-state data stored in the normal case storage unit; a cause diagnosis unit which, if it is determined by the anomaly diagnosis unit that there is an anomaly, then estimates a failure cause based on a similarity ratio between an abnormal contribution ratio output from the anomaly diagnosis unit and the abnormal contribution ratio of each of failure causes stored in the abnormal case storage unit, the each failure cause including failure phenomena and failure parts, and a diagnosis result output unit outputting a result of diagnosis by the cause diagnosis unit.

Also in the failure cause diagnosis system of the present invention, the abnormal contribution ratio may be a normalized value obtained by decomposing per parameter the distance between the normal-state data stored in the normal case storage unit and the operational data about the target equipment to be diagnosed.

Also in the failure cause diagnosis system of the present invention, the cause diagnosis unit may include a specific cause input unit inputting the name of the failure cause identified by maintenance personnel, and an abnormal case updating unit comparing the cause name input through the specific cause input unit with cause names stored in the abnormal case storage unit for a match; wherein, in the event of a match, the abnormal case updating unit may update the abnormal contribution ratio per parameter of the cause names in the abnormal case storage unit by using the abnormal contribution ratio per parameter output from the anomaly diagnosis unit, and wherein, in the event of a mismatch, the abnormal case updating unit may add to the abnormal case storage unit the new cause name and the abnormal contribution ratio per parameter output from the anomaly diagnosis unit.

Also in the failure cause diagnosis system of the present invention, the cause diagnosis unit may include a design information storage unit storing design information generated by using design specification information and knowledge of a designer; wherein the cause diagnosis unit may calculate a matching ratio between the abnormal-state operational data output from the anomaly diagnosis unit and anomaly conditions of each failure cause stored in the design information storage unit, calculate a similarity ratio between the abnormal contribution ratio output from the anomaly diagnosis unit and the abnormal contribution ratio of each failure cause stored in the abnormal case storage unit, and estimate the failure cause by using weight information with which the matching ratio and the similarity ratio are set for each failure cause.

Also in the failure cause diagnosis system of the present invention, the design information may include as the component factors thereof the names of failure causes and the conditions to be met by each parameter upon occurrence of the failures.

Also in the failure cause diagnosis system of the present invention, the abnormal cases may include as the component factors thereof the names of failure causes and the abnormal contribution ratio per parameter upon occurrence of the failures.

Also in the failure cause diagnosis system of the present invention, the abnormal cases may include the number of cases in which failures have occurred.

In achieving the foregoing object of the present invention, there is further provided a failure cause diagnosis method for diagnosing a failure cause of equipment, the failure cause diagnosis method including the steps of: storing operational data in effect when the equipment is in the normal state and values obtained by transformation of the operational data; storing operational data in effect when equipment is an abnormal state or values obtained by transformation of the operational data; inputting diagnosis data about the target equipment to be diagnosed; determining whether there is an anomaly by using the diagnosis data and the normal-state data stored; and if it is determined that there is an anomaly, then estimating a failure cause based on a similarity ratio between an output abnormal contribution ratio and the abnormal contribution ratio of each of failure causes including failure phenomena and failure parts.

Also with the failure cause diagnosis method of the present invention for achieving the foregoing object thereof, the abnormal contribution ratio may be a normalized value obtained by decomposing per parameter the distance between the normal-state data and the operational data about the target equipment to be diagnosed.

Also, the failure cause diagnosis method of the present invention for achieving the foregoing object thereof may further include the steps of: inputting the name of a failure cause; comparing the input cause name with stored cause names for a match; updating, in the event of a match, the abnormal contribution ratio per parameter of the stored cause names by using the abnormal contribution ratio per input parameter, and adding, in the event of a mismatch, the cause name and the abnormal contribution ratio per output parameter.

Also, the failure cause diagnosis method of the present invention for achieving the foregoing object thereof may further include the steps of: storing design information generated by using design specification information and knowledge of a designer; calculating a matching ratio between the abnormal-state operational data and anomaly conditions of each failure cause; calculating a similarity ratio between the abnormal contribution ratio output and the abnormal contribution ratio of each failure cause, and estimating the failure cause by using a weight with which the matching ratio and the similarity ratio are set for each failure cause.

Also with the failure cause diagnosis method of the present invention for achieving the foregoing object thereof, the design information may include as the component factors thereof the names of failure causes and the conditions to be met by each parameter upon occurrence of the failures.

Also with the failure cause diagnosis method of the present invention for achieving the foregoing object thereof, the abnormal cases may include as the component factors thereof the names of failure causes and the abnormal contribution ratio per parameter upon occurrence of the failures.

Also with the failure cause diagnosis method of the present invention for achieving the foregoing object thereof, the abnormal cases may include the number of cases in which failures have occurred.

Effects of the Invention

According to the present invention, it is possible to perform a failure cause diagnosis in keeping with the individual differences of the target equipment to be diagnosed and the environment in which the equipment is used. It is also possible to implement a failure cause diagnosis that is applicable where there exist only limited numbers of failure cases.

BRIEF DESCRIPTION OF THE DRAWINGS

FIG. 1 shows a failure cause diagnosis system as the first embodiment of the present invention.

FIG. 2 shows a hardware configuration of a cause diagnosis device indicated in FIG. 1.

FIG. 9 shows a conceptual example of an abnormal case updating method for the second embodiment of the present invention.

FIG. 13 shows a structural example of design information for the third embodiment of the present invention.

EMBODIMENT FOR CARRYING OUT THE INVENTION

Figure 3:
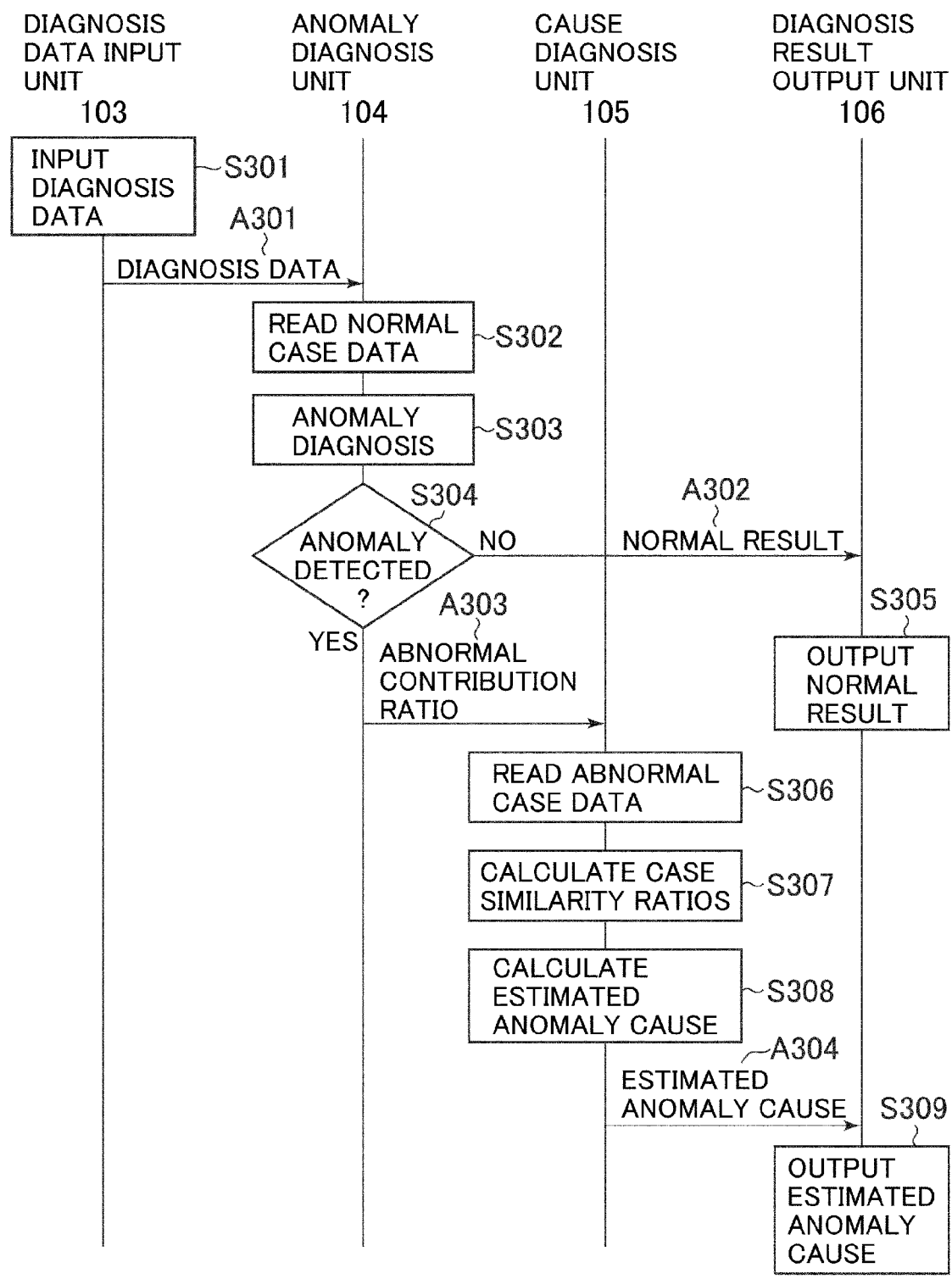
FIG. 3 shows a typical cause diagnosis flow executed by the failure cause diagnosis system as the first embodiment of the present invention.

Some embodiments of the present invention are explained below. It should be noted that the present invention is not limited to the embodiments in the ensuing explanation.

First Embodiment

FIG. 1 is a block diagram of the failure cause diagnosis system as the first embodiment of the present invention.

As shown in FIG. 1, the failure cause diagnosis system of this embodiment is configured to include a cause diagnosis device 10.

The cause diagnosis device 10 includes a normal case storage unit 101 that stores operational data in effect when equipment is in the normal state and/or values obtained by transformation of the operational data, an abnormal case storage unit 102 that stores operational data in effect when equipment is in an abnormal state and/or values obtained by transformation of the operational data, a diagnosis data input unit 103 that inputs the target operational data to be diagnosed from the outside, an anomaly diagnosis unit 104 that performs anomaly diagnosis by using diagnosis data obtained from the diagnosis data input unit 103 and the data stored in the normal case storage unit 101, a cause diagnosis unit 105 that performs cause diagnosis by using abnormal contribution ratios generated by the anomaly diagnosis unit 104 and the data stored in the abnormal case storage unit 102, and a diagnosis result output unit 106 that outputs cause diagnosis results generated by the cause diagnosis unit 105.

FIG. 2 shows a typical hardware configuration of the cause diagnosis device 10. The cause diagnosis device 10 is configured with a communication device 11, an input/output device 12, a storage device 13, a CPU 14, a memory 15, and a read device 16 interconnected by an internal signal line 18 such as a bus.

A processing flow of the failure cause diagnosis system of this embodiment is explained. The processing flow to be described below is carried out by processing units in the devices constituting the failure cause diagnosis system, the processing units being implemented by loading relevant programs from a storage device of the cause diagnosis device into memory for execution by a CPU. The programs may be either stored beforehand in the storage device or installed as needed via other storage media or communication media (e.g., networks or carrier waves that support the networks).

FIG. 3 shows a cause diagnosis flow executed by the cause diagnosis device 10.

The user first inputs the target operational data to be diagnosed to the diagnosis data input unit 103 of the cause diagnosis device 10 (in step 301 or simply S301, likewise hereunder). Here, the diagnosis data refers to equipment sensor information, warning information, and information obtained by transforming the sensor information using such techniques as FFT (Fast Fourier Transform). The diagnosis data input unit 103 then sends the input diagnosis data (A301) to the anomaly diagnosis unit 104.

The anomaly diagnosis unit 104 then reads normal case data from the normal case storage unit 101 (S302). Here, the normal case data may be data indicative of normal ranges of sensors or equipment according to design, or sensor data collected from equipment in the normal state. An anomaly diagnosis is then performed using the diagnosis data (A301) and the normal case data (S303). Here, an anomaly may be diagnosed simply in reference to threshold values or by use of such techniques as clustering. Based on the result of the anomaly diagnosis, it is determined whether there is an anomaly (S304). If it is determined that there is no anomaly, a normal result (A302) is sent to the diagnosis result output unit 106. In turn, the diagnosis result output unit 106 outputs the received normal result (S305). On the other hand, if it is determined that there is an anomaly, an abnormal contribution ratio (A303) output from the anomaly diagnosis unit 104 is sent to the cause diagnosis unit 105. Here, the abnormal contribution ratio is a normalized value obtained by decomposing per parameter the distance between normal case data and diagnosis data. Details of the abnormal contribution ratio are shown in FIG. 4.

Figure 5:
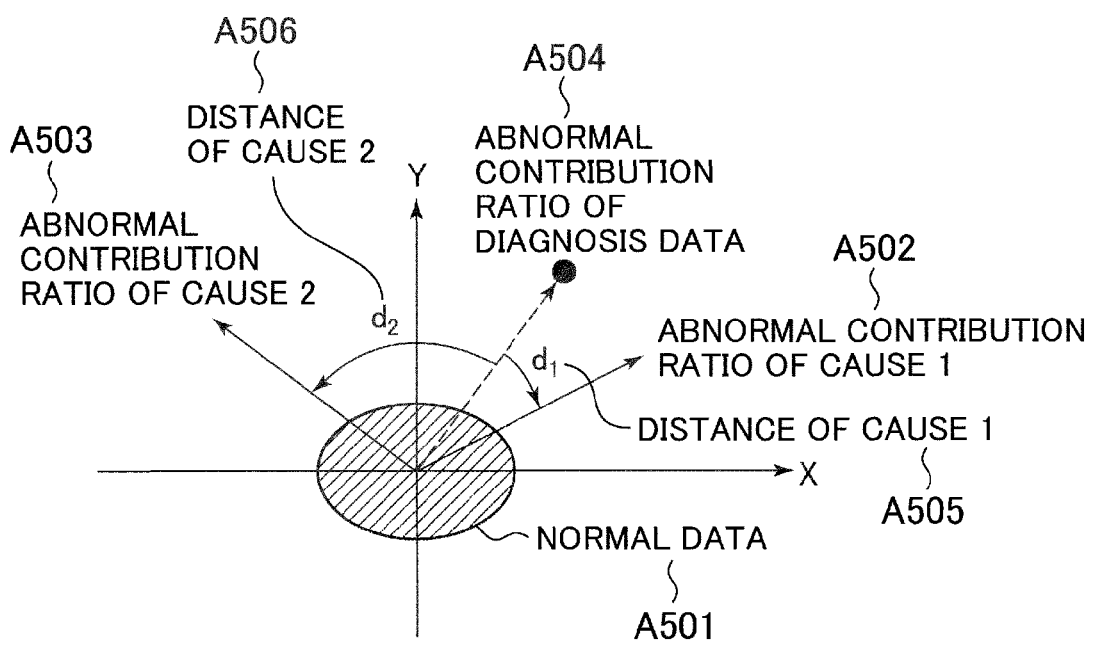
FIG. 5 shows a conceptual example of a cause diagnosis method used by the present invention.

The cause diagnosis unit 105 then reads abnormal case data from the abnormal case storage unit 102 (S306). Here, the abnormal case data refers to abnormal contribution ratios of those past failures of which the causes including phenomena and parts have been identified. Then a case similarity ratio is calculated by using the received abnormal contribution ratio (A303) and the abnormal case data (S307). Here, the case similarity ratio is a value calculated from an angle between the abnormal contribution ratio of the diagnosis data and the abnormal contribution ratio of each failure cause. The each failure includes failure phenomena and failure parts. Details of the case similarity ratio are shown in FIG. 5. The cause with the largest of the case similarity ratios is then selected as an estimated anomaly cause (S308). Selection of the estimated anomaly cause is not limited to taking the one having the largest of the case similarity ratios. Alternatively, the causes having the largest five of the case similarity ratios may be selected, or all causes having the case similarity ratios larger than a threshold value may be selected. The estimated anomaly cause thus calculated (A304) is sent to the diagnosis result output unit 106.

The diagnosis result output unit 106 then outputs the estimated anomaly cause received (S309).

Figure 4:
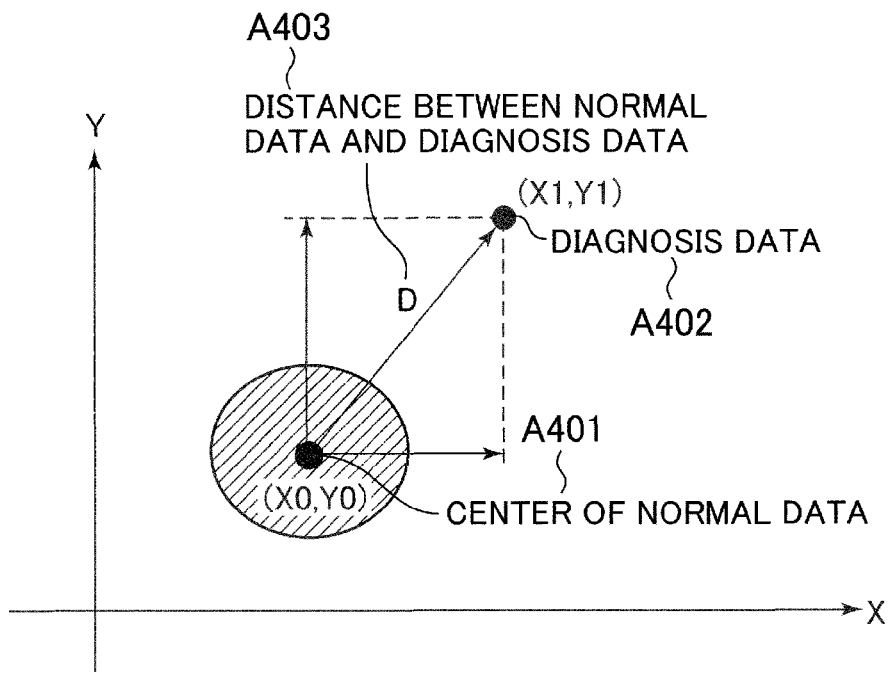
FIG. 4 shows a conceptual example of an abnormal contribution ratio used by the present invention.

FIG. 4 shows details of the abnormal contribution ratio calculated by the anomaly diagnosis unit 104 in the cause diagnosis device 10.

For purpose of simplification, the method for calculating abnormal contribution ratios is shown below on the assumption that the number of input parameters is 2. First of all, the center point (X0, Y0) (A401) of operational data in the normal state is acquired. Then a distance D (A403) between diagnosis data (X1, Y1) (A402) and the normal data is calculated. The distance D may be calculated by using the mathematical expression (1) given below.

[Expression 1]

$$\text{Disance } D = \sqrt{(X1-X0)^2 + (Y1-Y0)^2} \quad (1)$$

An abnormal contribution ratio is then calculated. The abnormal contribution ratio is obtained by using the mathematical expressions (2) and (3) below based on the normal data center (A401), diagnosis data (A402), and distance D.

[Expression 2]

$$\text{Abnormal contribution ratio } X = \begin{cases} \dfrac{(X1-X0)^2}{D^2}(X1 \geq X0) \\ -\dfrac{(X1-X0)^2}{D^2}(X1 < X0) \end{cases} \quad (2)$$

[Expression 3]

$$\text{Abnormal contribution ratio } Y = \begin{cases} \dfrac{(Y1-Y0)^2}{D^2}(Y1 \geq Y0) \\ -\dfrac{(Y1-Y0)^2}{D^2}(Y1 < Y0) \end{cases} \quad (3)$$

As explained, the abnormal contribution ratio is calculated per parameter. Even where the number of parameters is increased, their abnormal contribution ratios can be calculated in like manner. Also, the greater the distance from the normal data, the larger the abnormal contribution ratio of a given parameter becomes in absolute value. The sum total of the absolute value of the abnormal contribution ratios involved is 1.

FIG. 5 illustrates the method for calculating a case similarity ratio as well as the method for calculating an estimated anomaly cause by use of the cause diagnosis unit 105 in the cause diagnosis device 10. For purpose of simplification, the method for calculating the case similarity ratio is explained on the assumption that the number of input parameters is 2 and that there are two abnormal cases collected.

First of all, the abnormal contribution ratio per cause (A502, A503) is acquired in reference to normal data (A501). The abnormal contribution ratio of the target data to be diagnosed (A504) is then acquired. Calculated next are an angle $d_1$ (A505) between the abnormal contribution ratio of the diagnose data and the abnormal contribution ratio of cause 1, and an angle $d_2$ (A506) between the abnormal contribution ratio of the diagnose data and the abnormal contribution ratio of cause 2. The case similarity ratio is then obtained by subtracting the calculated angle from 90 by using the mathematical expression (4) given below.

[Expression 4]

$$\text{Case similarity ratio } de_n = 90 - d_n \quad (4)$$

Figure 6:
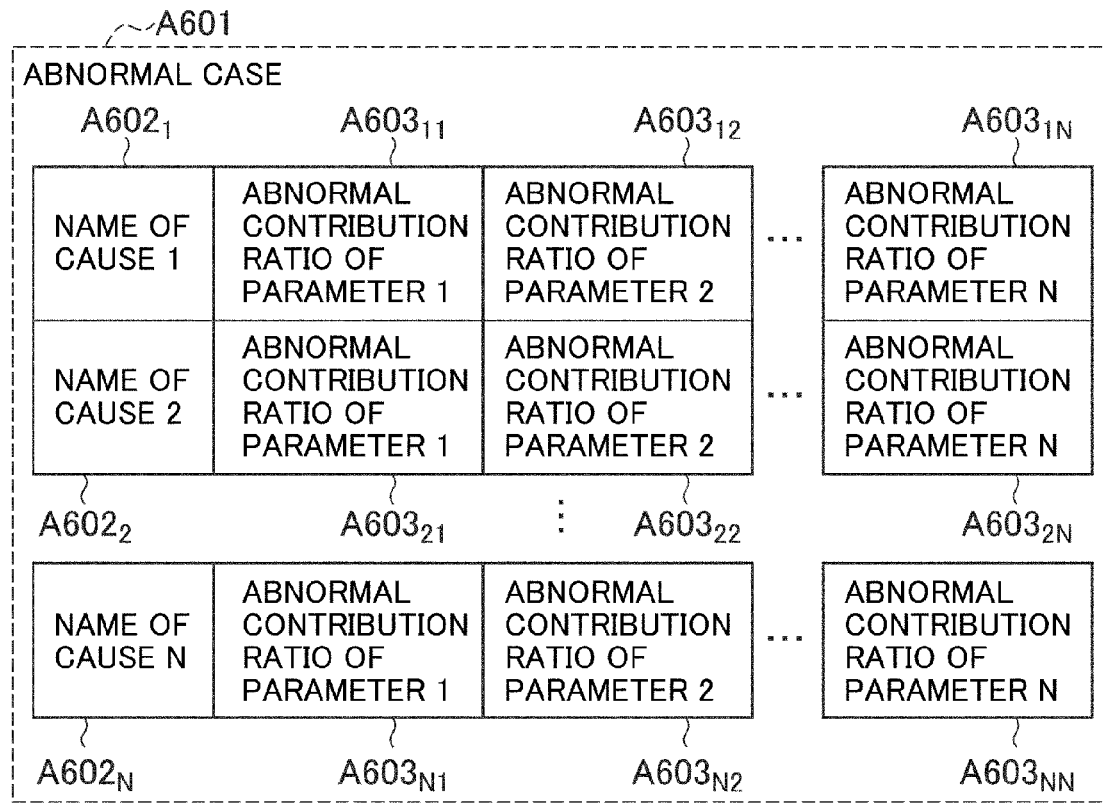
FIG. 6 shows a structural example of an abnormal case for the first embodiment of the present invention.

FIG. 6 shows a structure of an abnormal case for the first embodiment of the present invention, the case being stored in the abnormal case storage unit 102.

An abnormal case (A601) is made up of a cause 1 name (A602$_1$) indicative of a name that identifies the failure cause including failure phenomena and failure parts and the abnormal contribution ratios of the parameters involved (A603$_{11}$ through A603$_{1N}$). If there exist a plurality of failure causes included in the abnormal case, there are provided as many sets of the above structure (A602$_1$, A603$_{11}$ through A603$_{1N}$) as the number of the failure causes involved. The order of the components making up the abnormal case is not limited to what is indicated here. Any other order may be adopted as long as it includes at least the components indicated above.

Second Embodiment

Figure 7:
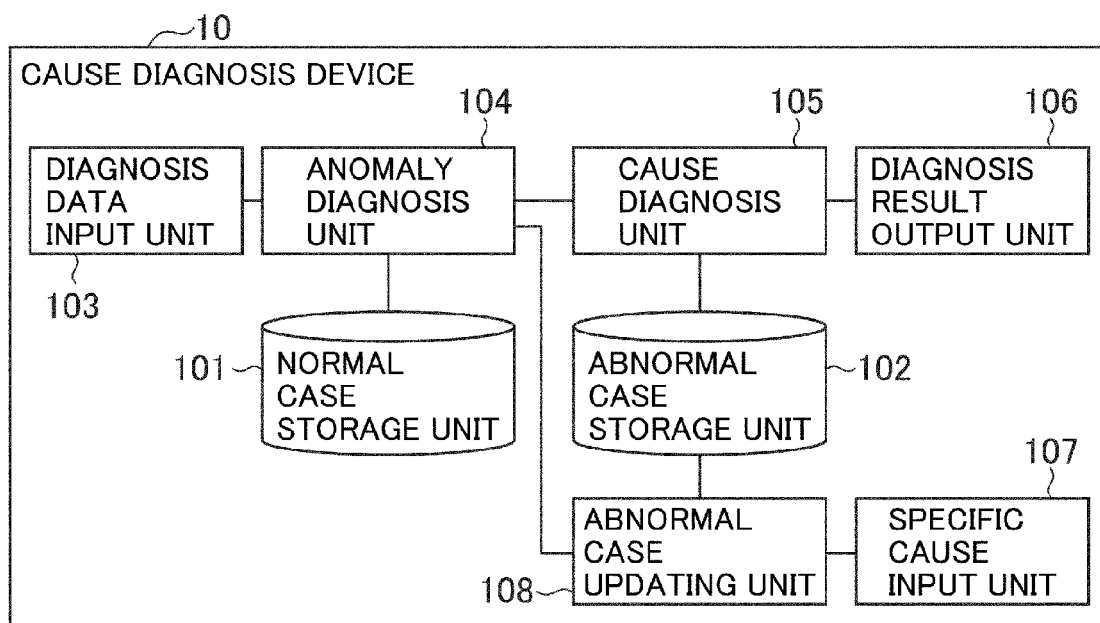
FIG. 7 shows a configuration of a failure cause diagnosis system as the second embodiment of the present invention.

FIG. 7 is a block diagram of the failure cause diagnosis system as the second embodiment of the present invention.

As shown in FIG. 7, the failure cause diagnosis system of this embodiment is configured to have a cause diagnosis device 10.

The cause diagnosis device 10 includes a normal case storage unit 101 that stores operational data in effect when equipment is in the normal state and/or values obtained by transformation of the operational data, an abnormal case storage unit 102 that stores operational data in effect when equipment is in an abnormal state and/or values obtained by transformation of the operational data, a diagnosis data input unit 103 that inputs the target data to be diagnosed from the outside, an anomaly diagnosis unit 104 that performs anomaly diagnosis by using diagnosis data obtained from the diagnosis data input unit 103 and the data stored in the normal case storage unit 101. The cause diagnosis device 10 further includes a cause diagnosis unit 105 that performs cause diagnosis by using abnormal contribution ratios generated by the anomaly diagnosis unit 104 and the data stored in the abnormal case storage unit 102, a diagnosis result output unit 106 that outputs cause diagnosis results generated by the cause diagnosis unit 105, a specific cause input unit 107 that inputs failure causes identified by the designer or maintenance personnel and including failure phenomena and failure parts, and an abnormal case updating unit 108 that updates the abnormal cases stored in the abnormal case storage unit 102 by using the specific cause input through the specific cause input unit 107 and the abnormal contribution ratios generated by the anomaly diagnosis unit 104.

A processing flow of the failure cause diagnosis system of this embodiment is explained. The processing flow to be described below is carried out by processing units in the devices constituting the failure cause diagnosis system, the processing units being implemented by loading relevant programs from a storage device of the cause diagnosis device into memory for execution by a CPU. The programs may be either stored beforehand in the storage device or installed as needed via other storage media or communication media (e.g., networks or carrier waves that support the networks).

Figure 8:
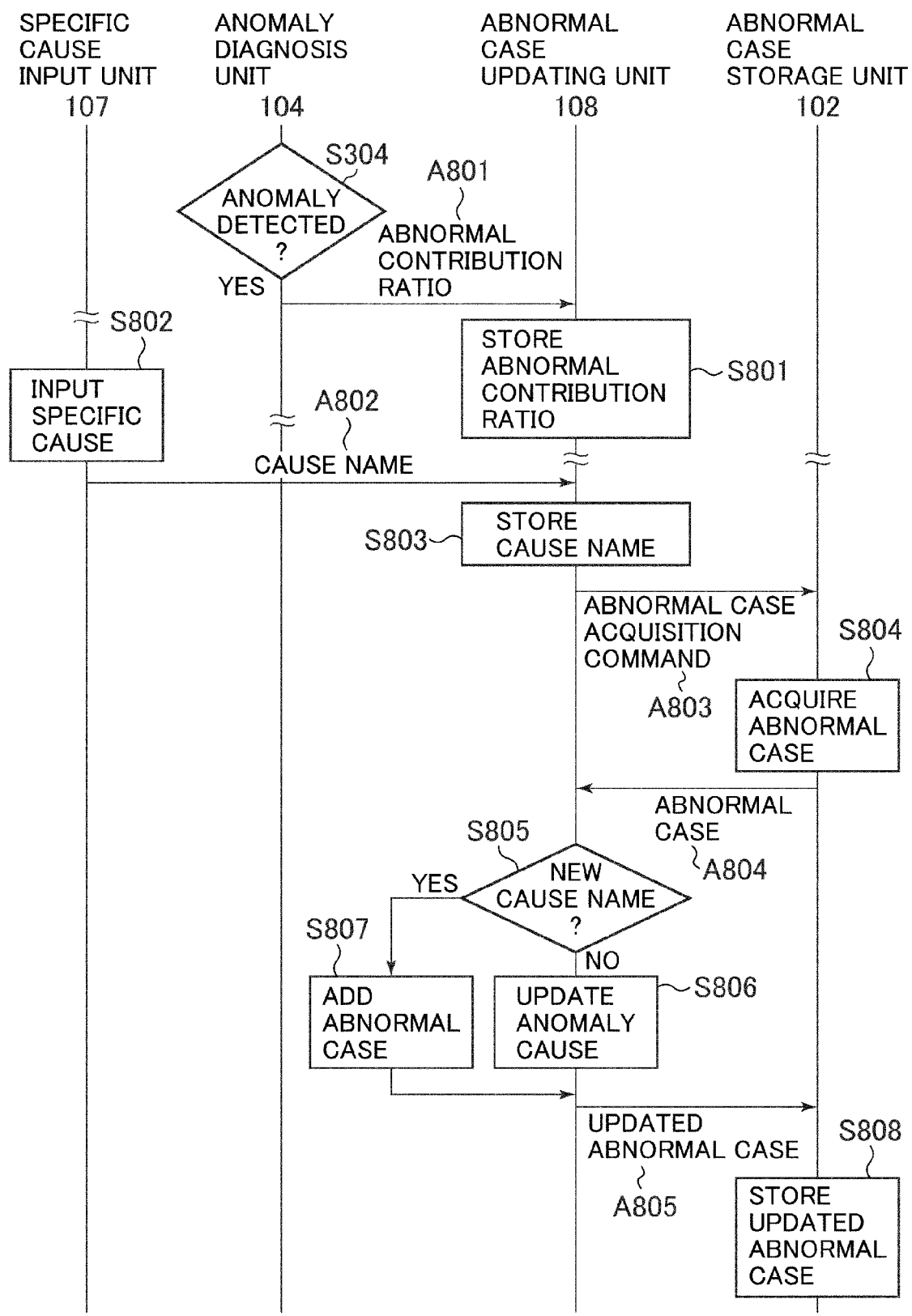
FIG. 8 shows an abnormal case updating flow executed by the failure cause diagnosis system as the second embodiment of the present invention.

FIG. 8 shows those portions of the cause diagnosis flow executed by the cause diagnosis device 10 in which an abnormal case is updated.

First, the steps up to S304 in FIG. 3 are carried out. If it is determined consequently that there is an anomaly, an abnormal contribution ratio (A801) output as a result of the anomaly diagnosis is sent to the abnormal case updating unit 108.

Next, the abnormal case updating unit 108 stores the received abnormal contribution ratio (S801).

Then the designer or maintenance personnel identify the failure cause including failure phenomena and failure parts.

Furthermore, the designer or maintenance personnel input the failure cause identified during maintenance work through the specific cause input unit 107 (S802). The input cause name (A802) is then sent to the abnormal case updating unit 108.

Also, the abnormal case updating unit 108 stores the received cause name (S803). The abnormal case updating unit 108 then sends an abnormal case acquisition command to the abnormal case storage unit 102 (A803).

Based on the received command, the abnormal case storage unit 102 acquires the abnormal case (S804). The abnormal case storage unit 102 then sends the acquired abnormal case (A804) to the abnormal case updating unit 108.

Next, the abnormal case updating unit 108 determines whether any stored cause name is included in the received abnormal case (S805). If it is determined that the abnormal case is already stored, the abnormal case updating unit 108 updates the abnormal contribution ratio of the cause name by using the abnormal contribution ratio stored in S801 (S806). FIG. 9 shows a specific method for updating an abnormal case. On the other hand, if it is determined that no stored item matches the received abnormal case, the case name and abnormal contribution ratio are added as a new anomaly (S807). Then the updated abnormal case (A805) is sent to the abnormal case storage unit 102.

Next, the abnormal case storage unit 102 stores the updated abnormal case received (S808).

FIG. 9 shows illustratively an abnormal case updating method carried out in S806 of FIG. 8.

First, the abnormal contribution ratio of cause 1 (A901) and that of cause 2 (A902) are acquired from the abnormal case storage unit 102. Acquired next is the abnormal contribution ratio (A903) output as a result of the anomaly diagnosis performed on diagnosis data. Then the designer or maintenance personnel identify the cause including failure phenomena and failure parts, and input cause 1 as the failure cause of the diagnosis data (S901). A new abnormal contribution ratio (A904) of cause 1 is then generated by using the information made up of the original abnormal contribution ratio (A901) of cause 1 and the abnormal contribution ratio (A903) of the diagnosis data. Here, the new abnormal contribution ratio $\mu_n$ may be calculated as, say, an average of the abnormal contribution ratios collected in the past by means of the mathematical expression (5) below using the most recent abnormal contribution ratio $\mu_{n-1}$, the number "n" of cases, and the abnormal contribution ratio $x_n$ of the diagnosis data.

[Expression 5]

$$\text{New abnormal contribution ratio } \mu_n = \frac{\mu_{n-1} \times (n-1) + x_n}{n} \quad (5)$$

Here, the abnormal case updating method is not limited to the method explained above. Alternatively, it may be possible to update the new abnormal contribution ratio by varying the influence rate of the diagnosis data in accordance with a specific accuracy of the failure cause.

Figures 10, 11:
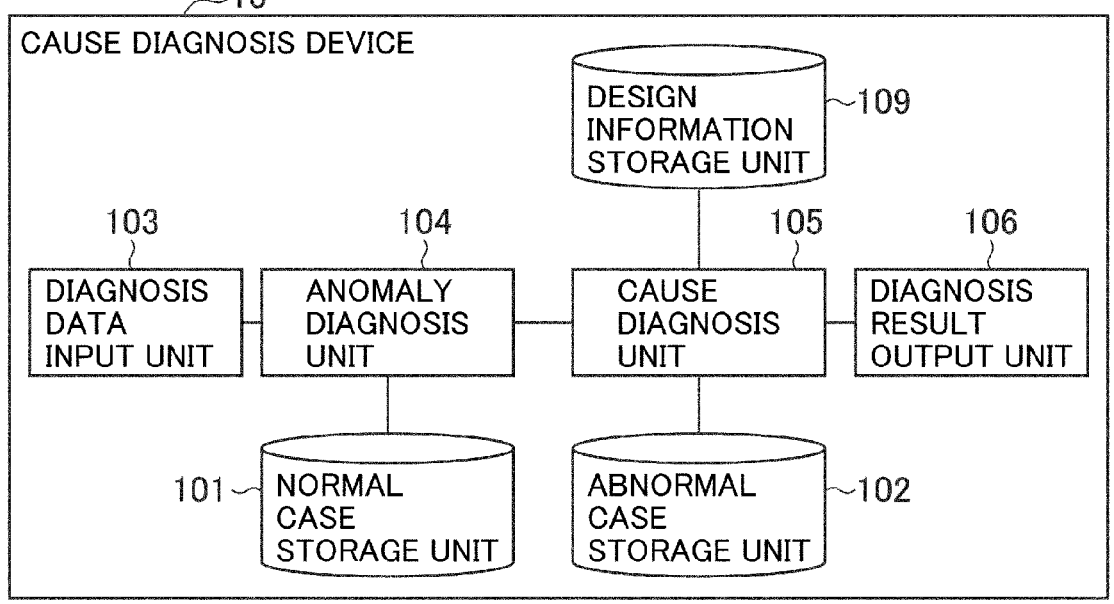
FIG. 10 shows a structural example of an abnormal case for the second embodiment of the present invention.
FIG. 11 shows a configuration of a failure cause diagnosis system as the third embodiment of the present invention.

FIG. 10 shows a structure of an abnormal case stored in the abnormal case storage unit 102 of the second embodiment of this invention.

An abnormal case (A1001) is made up of the name of cause 1 (A1002$_1$) identifying the failure cause including failure phenomena and failure parts, the number of previously collected cases (A1003$_1$), and the abnormal contribution ratios of the parameters involved (A1004$_{11}$ through A1004$_{1N}$). If there exist a plurality of causes included in the abnormal case, there are provided as many sets of the above structure (A1002$_1$, A1003$_1$, A1004$_{11}$ through A1004$_{1N}$) as the number of the causes involved. The order of the components making up the abnormal case is not limited to what is indicated here. Any other order may be adopted as long as it includes at least the components indicated above.

Third Embodiment

FIG. 11 is a block diagram of the failure cause diagnosis system as the third embodiment of the present invention.

As shown in FIG. 11, the failure cause diagnosis system of this embodiment is configured to have a cause diagnosis device 10.

The cause diagnosis device 10 includes a normal case storage unit 101 that stores operational data in effect when equipment is in the normal state and/or values obtained by transformation of the operational data, an abnormal case storage unit 102 that stores operational data in effect when equipment is in an abnormal state and/or values obtained by transformation of the operational data, a diagnosis data input unit 103 that inputs the target data to be diagnosed from the outside, an anomaly diagnosis unit 104 that performs anomaly diagnosis by using diagnosis data obtained from the diagnosis data input unit 103 and the data stored in the normal case storage unit 101. The cause diagnosis device 10 further includes a design information storage unit 109 that stores design information extracted from the design specification and from the designer; a cause diagnosis unit 105 that performs cause diagnosis by using the diagnosis data in an abnormal state and abnormal contribution ratios from the anomaly diagnosis unit 104, the data stored in the abnormal case storage unit 102, and the data stored in the design information storage unit 109; and a diagnosis result output unit 106 that outputs cause diagnosis results generated by the cause diagnosis unit 105.

A processing flow of the failure cause diagnosis system of this embodiment is explained. The processing flow to be described below is carried out by processing units in the devices constituting the failure cause diagnosis system, the processing units being implemented by loading relevant programs from a storage device of the cause diagnosis device into memory for execution by a CPU. The programs may be either stored beforehand in the storage device or installed as needed via other storage media or communication media (e.g., networks or carrier waves that support the networks).

Figure 12:
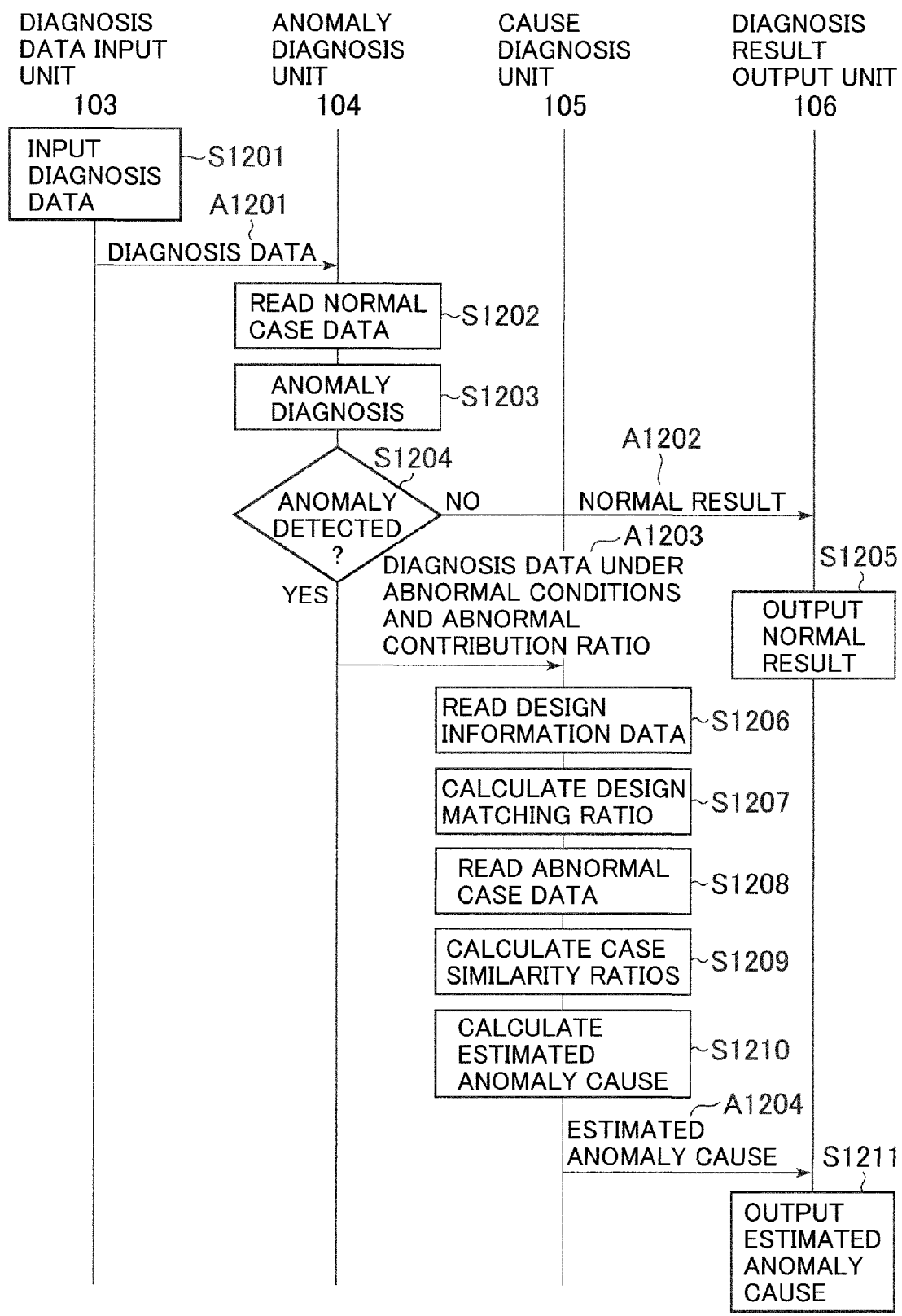
FIG. 12 shows a cause diagnosis flow executed by the failure cause diagnosis system as the third embodiment of the present invention.

FIG. 12 shows a cause diagnosis flow executed by the cause diagnosis device 10.

The user first inputs the target diagnosis data to be diagnosed to the diagnosis data input unit 103 of the cause diagnosis device 10 (S1201). The diagnosis data input unit 103 then sends the input diagnosis data (A1201) to the anomaly diagnosis unit 104.

Next, the anomaly diagnosis unit 104 reads normal case data from the normal case storage unit 101 (S1202). An anomaly diagnosis is then performed by using the diagnosis data (A1201) and the normal case data (S1203). Based on the result of the anomaly diagnosis, it is determined whether there is an anomaly (S1204). If it is determined consequently that there is no anomaly, a normal result (A1202) is sent to the diagnosis result output unit 106. In turn, the diagnosis result output unit 106 outputs the received normal result (S1205). On the other hand, if it is determined that there is an anomaly, the diagnosis data in an abnormal state and the abnormal contribution ratio (A1203) output as a result of the anomaly diagnosis are sent to the cause diagnosis unit 105. Here, the diagnosis data in an abnormal state refers to the diagnosis data about the part that was found abnormal by the anomaly diagnosis unit 104.

Next, the cause diagnosis unit 105 reads design information from the design information storage unit 109 (S1206). Here, the design information refers to the information indicative of design anomaly conditions of each cause. Details of the design information are shown in FIG. 13. It is then determined to what degree the input diagnosis data in an abnormal state (A1203) matches the design information, whereby a design matching ratio is calculated (S1207). Here, in order to handle the design matching ratio on the same plane as the case similarity ratio, the design matching ratio is assumed to be 90 in the event of a match between the diagnosis data in an abnormal state and the design information; the design matching ratio is assumed to be 0 or −90 in the event of a mismatch. Abnormal case data is then read from the abnormal case storage unit 102 (S1208). A case similarity ratio is then calculated (S1209) by using the input abnormal contribution ratio (A1203) and abnormal case data. The method for calculating the case similarity ratio is the same as that explained above in reference to FIG. 5. An estimated anomaly cause is then calculated from the calculated design matching ratio and case similarity ratio (S1210). Here, the estimated anomaly cause is calculated as the largest of the values obtained by multiplying the design matching ratio "dd" and case similarity ratio "de" by predetermined weight coefficients (wd, we). Specifically, the calculation is made by using the mathematical expression (6) given below.

[Expression 6]

$$\text{Estimated anomaly cause Cause} = \max_{k=1 \sim n} (wd_k \times dd_k + we_k \times de_k) \quad (6)$$

Here, the weight coefficients are fixed or variable values set for each anomaly cause. For an anomaly cause that can be identified by design information, the value "wd" is set to be large beforehand; for an anomaly cause that can be identified by case information, the value "we" is set to be large in advance. Where not much case information has been collected yet, the reliability of the diagnosis based on the case information is considered to be low. In that case, the weight coefficients may be varied depending on the number "n" of cases stored in the abnormal case storage unit 102. Furthermore, calculation of the estimated anomaly cause is not limited to taking the one having the largest of the case similarity ratios. Alternatively, the causes having the largest five of the case similarity ratios may be selected, or all causes having the case similarity ratios larger than a threshold value may be selected.

The estimated anomaly cause thus calculated (A1204) is sent to the diagnosis result output unit 106.

The diagnosis result output unit 106 then outputs the estimated anomaly cause received (S1211).

FIG. 13 shows a structure of design information stored in the design information storage device 109.

The design information ($A1301$) is made up of the name of cause 1 ($A1302_1$) identifying the failure cause including failure phenomena and failure parts and the anomaly conditions of the parameters involved ($A1303_{11}$ through $A1303_{1N}$). Here, the anomaly condition refers to a simple threshold condition specifying that an anomaly be recognized if the threshold value of, say, 100 is exceeded for a given parameter, or an anomaly determination condition conceivable by design specifying that an anomaly be recognized if, say, it occurred 10 times in the past 5 minutes. If there exist a plurality of causes included in the design information, there are provided as many sets of the above structure ($A1302_1$, $A1303_{11}$ through $A1303_{1N}$) as the number of the causes involved. The order of the components making up the design information is not limited to what is indicated here. Any other order may be adopted as long as it includes at least the components indicated above.

By carrying out the procedures and implementing the data structures discussed above, it is possible to bring about a failure cause diagnosis in keeping with the individual differences of the target equipment to be diagnosed and the environment in which the equipment is used. It is also possible to implement a failure cause diagnosis that is applicable even where the number of failure cases is limited.

The present invention when embodied is not limited to the above-described embodiments. Variations and modifications of the embodiments may be made without departing from the spirit and scope of the invention.

For example, the processing units such as the anomaly diagnosis unit and cause diagnosis unit within the cause diagnosis device 10 may alternatively be set up independently of one another and send and receive data therebetween over a network or the like.

In the foregoing alternative, there is no fundamental change in the processing conducted by the system as a whole.

DESCRIPTION OF REFERENCE NUMERALS

10 Cause diagnosis device
11 Communication device
12 Input/output device
13 Storage device
14 CPU
15 Memory
16 Read device
17 Storage media
18 Internal signal line
101 Normal case storage unit
102 Abnormal case storage unit
103 Diagnosis data input unit
104 Anomaly diagnosis unit
105 Cause diagnosis unit
106 Diagnosis result output unit
107 Specific cause input unit
108 Abnormal case updating unit
109 Design information storage unit
A301, A402, A1201 Diagnosis data
A302, A1202 Normal result
A303, A801 Abnormal contribution ratio
A304, A1204 Estimated anomaly cause
A401 Center of normal data
A403 Distance between normal data and diagnosis data
A501 Normal data
A502, A901 Abnormal contribution ratio of cause 1
A503, A902 Abnormal contribution ratio of cause 2
A504, A903 Abnormal contribution ratio of diagnosis data
A505 Distance of cause 1
A506 Distance of cause 2
A601, A804, A1001 Abnormal case
$A602_1$~$A602_N$, A802, $A1002_1$~$A1002_N$, $A1302_1$||$A1302_N$ Cause names
$A603_{11}$~$A603_{NN}$, $A1004_{11}$~$A1004_{NN}$ Abnormal contribution ratios of parameters
A803 Abnormal case acquisition command
A805 Updated abnormal case
A904 Abnormal contribution ratio (updated) of cause 1
$A1003_1$~$A1003_N$ Number of cause cases
A1203 Diagnosis data in abnormal state, abnormal contribution ratio
A1301 Design information
$A1301_{11}$~$A1303_{NN}$ Anomaly conditions for parameters

The invention claimed is:

1. A failure cause diagnosis system comprising a cause diagnosis device for diagnosing a failure cause of equipment; wherein the cause diagnosis device includes:
   a normal case storage unit storing operational data in effect when equipment is in a normal state or values obtained by transformation thereof;
   an abnormal case storage unit storing operational data in effect when equipment is in an abnormal state or values obtained by transformation thereof;
   a diagnosis data input unit configured to receive data from an equipment sensor corresponding to target equipment and to input operational data about the target equipment to be diagnosed as diagnosis data;
   an anomaly diagnosis unit determining whether there is an anomaly by using the diagnosis data and normal-state data stored in the normal case storage unit;
   a cause diagnosis unit which, if it is determined by the anomaly diagnosis unit that there is an anomaly, estimates a failure cause based on a similarity ratio between an abnormal contribution ratio output from the anomaly diagnosis unit and an abnormal contribution ratio of each of failure causes stored in the abnormal case storage unit, the each failure cause including failure phenomena and failure parts, wherein the abnormal contribution ratios are each represented as lines in a two-dimensional plane and each similarity ratio is computed based on an angle between the abnormal contribution ratio output from the anomaly diagnosis unit and each abnormal contribution ratio of each failure cause; and
   a diagnosis result output unit outputting a result of diagnosis by the cause diagnosis unit, wherein equipment maintenance is conducted based on the result of the diagnosis.

2. The failure cause diagnosis system according to claim 1, wherein the abnormal contribution ratio output from the anomaly diagnosis unit is a normalized value obtained by decomposing per parameter a distance between the normal-state data stored in the normal case storage unit and the operational data about the target equipment to be diagnosed.

3. The failure cause diagnosis system according to claim 1, wherein the cause diagnosis unit includes:
   a specific cause input unit inputting a name of the failure cause identified by maintenance personnel, and
   an abnormal case updating unit comparing the cause name input through the specific cause input unit with cause names stored in the abnormal case storage unit for a match;
   wherein, in the event of a match, the abnormal case updating unit updates an abnormal contribution ratio per parameter of the cause names in the abnormal case storage unit by using the abnormal contribution ratio per parameter output from the anomaly diagnosis unit, and wherein, in the event of a mismatch, the abnormal case updating unit adds to the abnormal case storage unit a new cause name and the abnormal contribution ratio per parameter output from the anomaly diagnosis unit.

4. The failure cause diagnosis system according to claim 1, wherein the cause diagnosis unit includes a design information storage unit storing design information generated by using design specification information and knowledge of a designer;

wherein the cause diagnosis unit calculates a matching ratio between the abnormal-state operational data output from the anomaly diagnosis unit and anomaly conditions of each failure cause stored in the design information storage unit, calculates a similarity ratio between the abnormal contribution ratio output from the anomaly diagnosis unit and the abnormal contribution ratio of each failure cause stored in the abnormal case storage unit, and estimates the failure cause by using weight information with which the matching ratio and the similarity ratio are set for each failure cause.

5. The failure cause diagnosis system according to claim 4, wherein the design information includes as component factors thereof names of failure causes and the conditions to be met by each parameter upon occurrence of failures.

6. The failure cause diagnosis system according to claim 1, wherein abnormal cases include as component factors thereof names of failure causes and an abnormal contribution ratio per parameter upon occurrence of failures.

7. The failure cause diagnosis system according to claim 6, wherein the abnormal cases include a number of cases in which failures have occurred.

8. A failure cause diagnosis method for diagnosing a failure cause of equipment, the failure cause diagnosis method comprising the steps of:

storing operational data in effect when the equipment is in a normal state or values obtained by transformation thereof;

storing operational data in effect when equipment is in an abnormal state or values obtained by transformation thereof;

receiving data from an equipment sensor corresponding to target equipment;

inputting the received data as diagnosis data about the target equipment to be diagnosed;

determining whether there is an anomaly by using the diagnosis data and normal-state data stored; and if it is determined that there is an anomaly, estimating a failure cause based on a similarity ratio between an output abnormal contribution ratio and an abnormal contribution ratio of each of failure causes, the each failure cause including failure phenomena and failure parts, wherein the abnormal contribution ratios are each represented as lines in a two-dimensional plane and each similarity ratio is computed based on an angle between the output abnormal contribution ratio and each abnormal contribution ratio of each failure cause, and equipment maintenance is conducted based on the estimated failure cause.

9. The failure cause diagnosis method according to claim 8, wherein the abnormal contribution ratio is a normalized value obtained by decomposing per parameter a distance between the normal-state data and the operational data about the target equipment to be diagnosed.

10. The failure cause diagnosis method according to claim 8, further comprising the steps of:

inputting a name of a failure cause;

comparing the input cause name with stored cause names for a match;

updating, in the event of a match, an abnormal contribution ratio per parameter of the stored cause names by using an abnormal contribution ratio per input parameter, and adding, in the event of a mismatch, the cause name and an abnormal contribution ratio per output parameter.

11. The failure cause diagnosis method according to claim 8, further comprising the steps of:

storing design information generated by using design specification information and knowledge of a designer;

calculating a matching ratio between abnormal-state operational data and anomaly conditions of each failure cause;

calculating a similarity ratio between the output abnormal contribution ratio and the abnormal contribution ratio of each failure cause, and estimating the failure cause by using a weight with which the matching ratio and the similarity ratio are set for each failure cause.

12. The failure cause diagnosis method according to claim 11, wherein the design information includes as component factors thereof names of failure causes and the conditions to be met by each parameter upon occurrence of failures.

13. The failure cause diagnosis method according to claim 8, wherein abnormal cases include as the component factors thereof names of failure causes and an abnormal contribution ratio per parameter upon occurrence of failures.

14. The failure cause diagnosis method according to claim 13, wherein the abnormal cases include a number of cases in which failures have occurred.

* * * * *